July 14, 1970 N. J. OBEL 3,520,529
OPERATION TABLE FOR BIG DOMESTIC ANIMALS
Filed Nov. 1, 1967 5 Sheets-Sheet 1

INVENTOR
NILS J. OBEL
BY
Mullin & Siegel
ATTORNEYS

July 14, 1970 N. J. OBEL 3,520,529

OPERATION TABLE FOR BIG DOMESTIC ANIMALS

Filed Nov. 1, 1967 5 Sheets-Sheet 3

INVENTOR
NILS J. OBEL

BY
Mullin & Siegel
ATTORNEYS

United States Patent Office 3,520,529
Patented July 14, 1970

3,520,529
OPERATION TABLE FOR BIG DOMESTIC ANIMALS
Nils J. Obel, % Royal Institute of Veterinary Art, Stockholm, Sweden
Filed Nov. 1, 1967, Ser. No. 679,797
Claims priority, application Sweden, Nov. 7, 1966, 15,168/66
Int. Cl. A61d *3/00;* A61g *13/00*
U.S. Cl. 269—325                         7 Claims

ABSTRACT OF THE DISCLOSURE

An operating table for large animals has a main table and an auxiliary table with means for elevating one or the other of said tables with respect to the other. Side supports are removably mounted on said auxiliary table and are adjustable to any suitable position to accommodate the body of the animal undergoing surgery.

---

Operation tables for clinically veterinary surgical operations on bigger domestic animals such as horses and cattle hitherto generally comprised a rather large, even working table, covered with cushions, usually square formed and for instance having side dimensions of 3 meters by 3 meters. Such a table, thereby, was either mounted level with the floor of the operation room or some few decimeters higher than the level of said floor, and in some cases it was possible to elevate from the first mentioned position into the last mentioned level. In the last mentioned case, the elevation means could for instance be operated by means of an hydraulically acting servo motor.

It has also been proposed to provide above such an operation table a smaller part, which was normally situated in the level of the main table or a little above its level, but which could, by means of a separate elevation device be elevated up to a level a little above the level of the main table however so that there could be observed a distinct difference in height position between them.

The present invention refers to an operation table for big domestic animals with a smaller auxiliary table, which may, by means of an elevation device be brought into a level position above the main table.

According to the invention, the auxiliary table is provided with arrangements for the fixture of side supports for supporting the body of the animal under operation, so that these supports may be mounted or demounted and also, when required, be adjusted into a suitable position in relation to the body of the animal.

The invention will be further described below under reference to attached drawings, which show a couple of different forms of execution of the invention. However, it shall be understood, that the invention is not limited to these specific forms of execution, but that all kinds of different modifications may occur within the frame of the invention.

Figure 1:
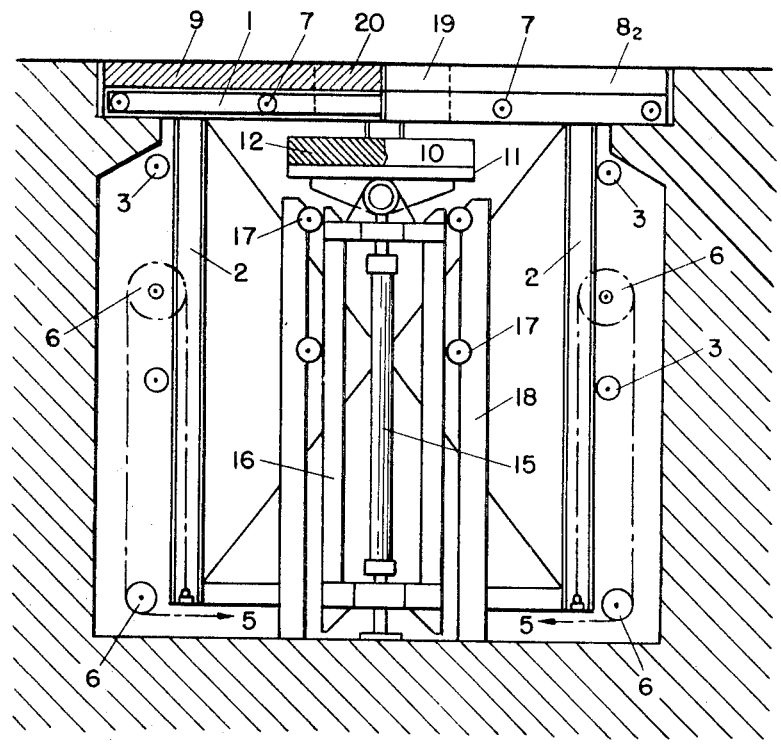
Figure 2:
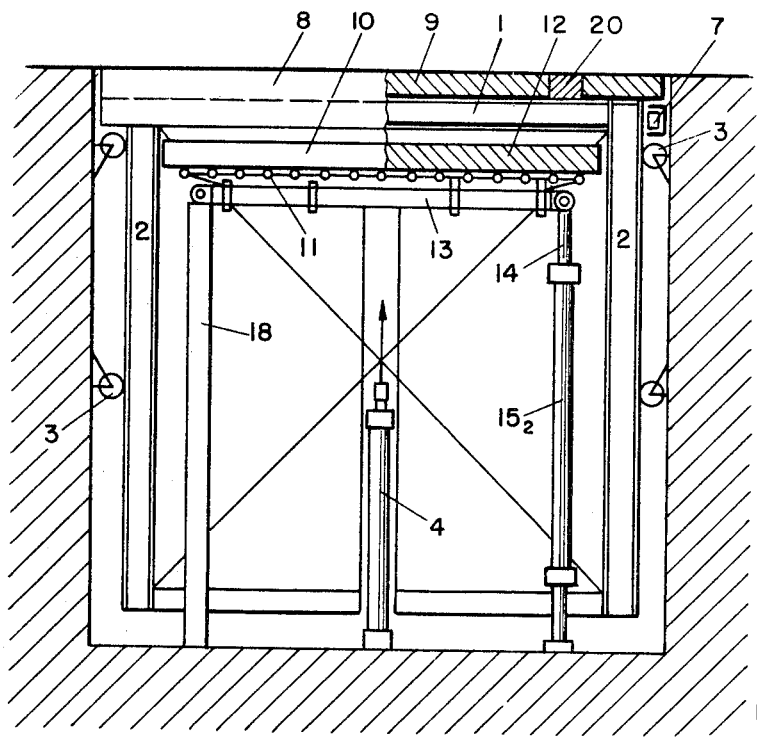
Figure 3:
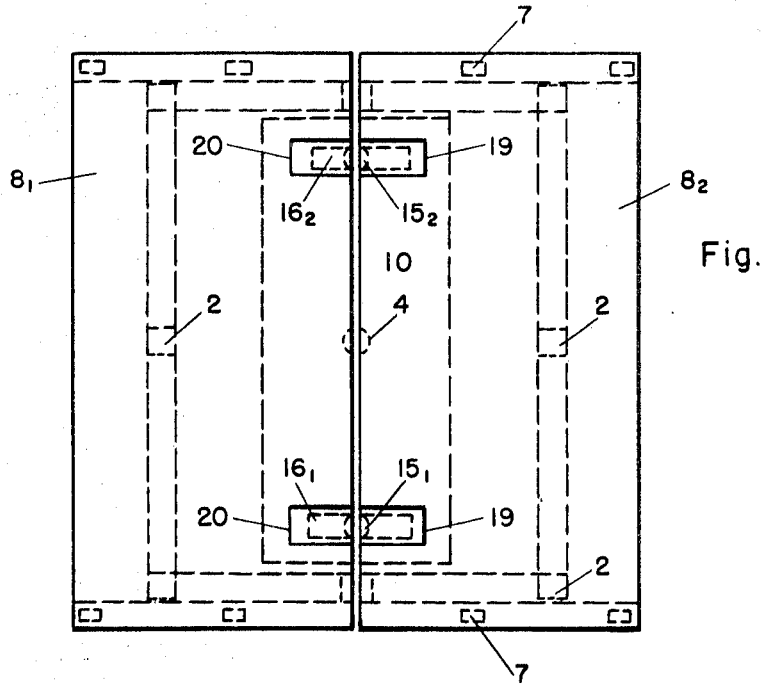
Figure 4:
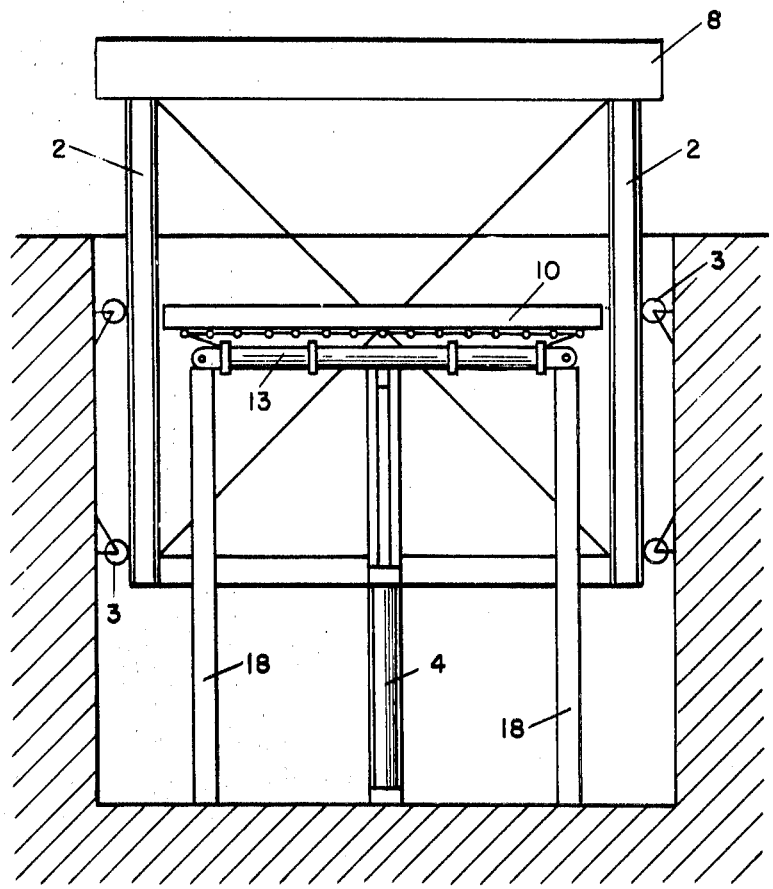
Figure 5:
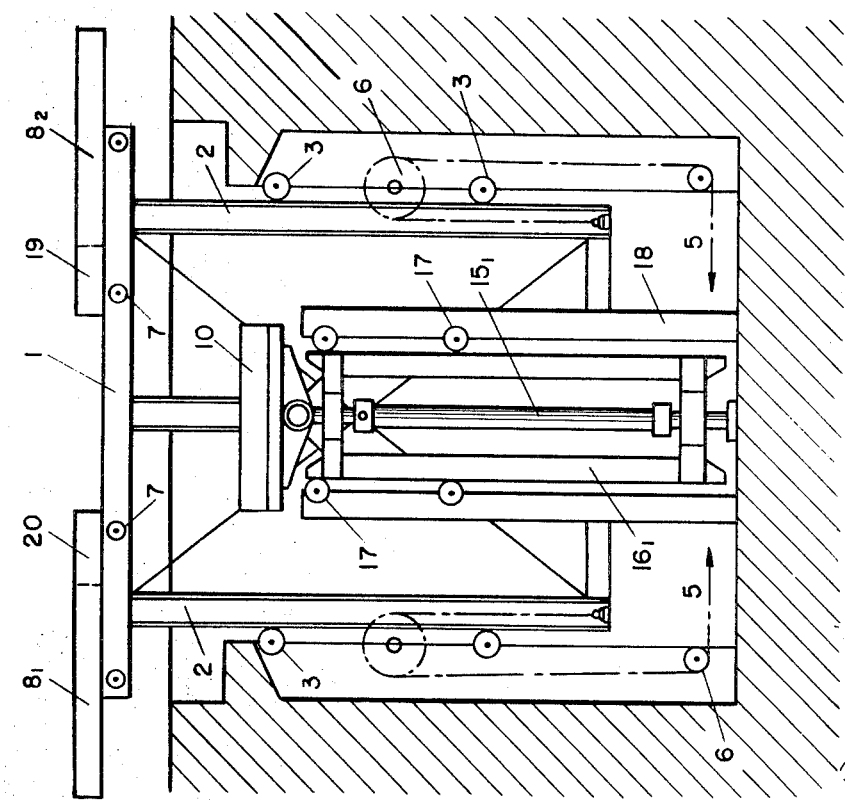
Figure 7:
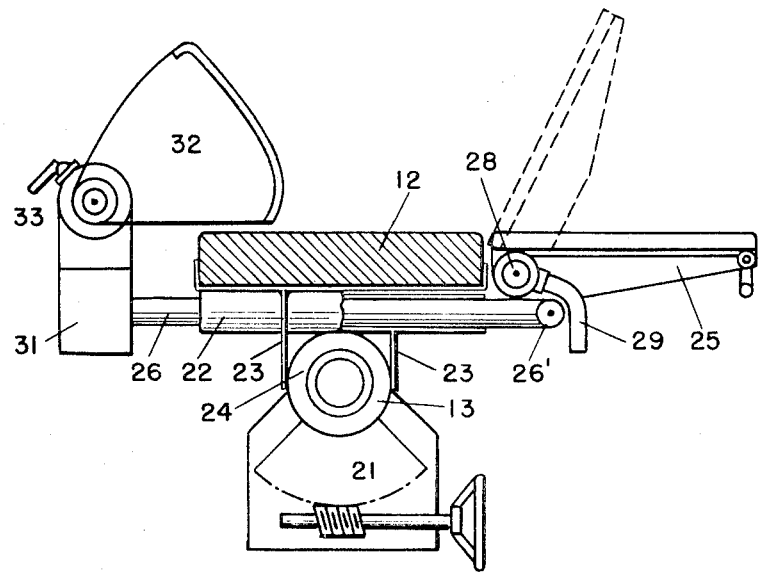
Figure 8:
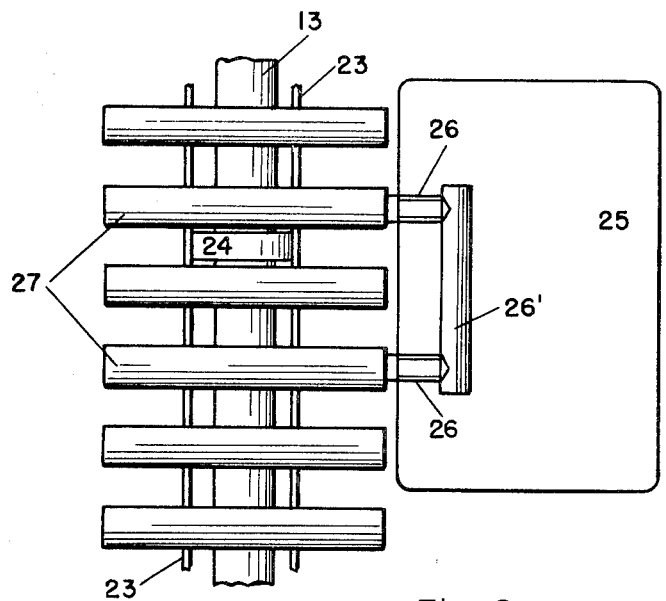
Figure 9:
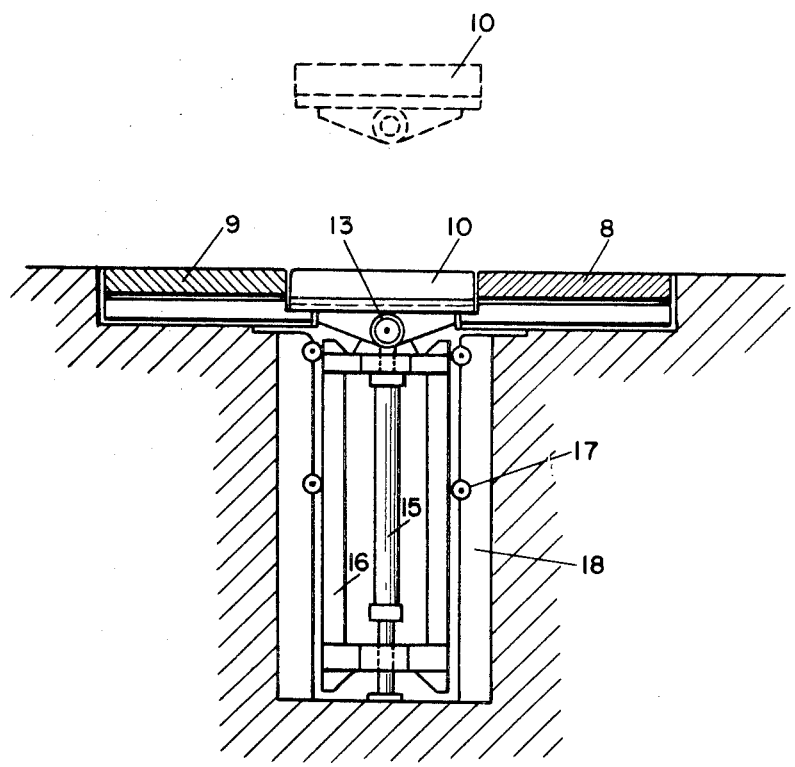

In the drawings, FIG. 1 shows an operation table according to the invention in its initial position, seen from the side and in part in section. FIG. 2 shows the same operation table seen in a direction perpendicular to the direction of projection in FIG. 1, and FIG. 3 shows the same operation table seen from above. FIG. 4 shows the operation table according to FIGS. 1–3 with the main table elevated into a level above the one of the floor of the operation room but in all other respects in the same projection as in FIG. 2, and FIG. 5 shows the same operation table with the two half parts, in which the operation table is divided up, displaced away from each other, but in all other respects in the same projection as in FIG. 1. FIG. 6 again shows the same operation table with the auxiliary table elevated into a level above that of the main table and with the two half parts of the main table again close to each other. FIG. 7 shows two different arrangements of side supports according to the invention, mounted releasably on the auxiliary table, the latter one being shown in section, perpendicularly to its longitudinal direction, and FIG. 8 shows the frame work of the auxiliary table after the cushions having been removed, by which the auxiliary table is normally covered. FIG. 9, finally, shows a simplified form of execution of the operation table according to the invention.

The operation table according to the present invention normally is arranged on top of a well in the floor of the operation room and with such dimensions, that the operation means required for the operation table may be accommodated in the well. The operation table lies in level with the floor of the operation room.

The carrier means for the main table consists in a number of beams 1, carried up by vertical pillars 2, which may be elevated or sunk down under guidance from fixed guide rollers 3. The elevation of the carrier means takes place by means of chains 5, controlled from servo motors, one of which being shown as an example at 4 in FIG. 2. The chains run over shift rollers, two of which for each of the shown chains being shown at 6 in FIG. 1. It is then obvious, that when pulling the chains 5 in the direction of the shown arrows, the carrier means of the main table will be elevated.

In the horizontal beams of the carrier means further wheels 7 are provided, on which the two half parts of the main table $8_1$ and $8_2$, see FIG. 3, rest. The two half parts $8_1$ and $8_2$ of the main table, in the usual way, are covered by cushions 9, see FIGS. 1 and 2. As soon as the main table has by means of the just mentioned servo motors and the chains been elevated sufficiently high over the level of the floor in the operation room, its two half parts $8_1$ and $8_2$ may be driven aside as shown in FIG. 5. The means for providing this side displacement movement are not shown in the drawing, but they may for instance comprise further cog wheel gears, chains or the like, controlled by means of hydraulic servo motors.

When the main table is dropped down into the well in the floor of the operation room, the auxiliary table 10 is arranged between the pillars 2 carrying up the main table, see FIG. 1. The auxiliary table comprises a ladder like arrangement, the perpendicularly to the longitudinal direction of the auxiliary table running means preferably comprising tubes 11, on which the cushions 12 of the auxiliary table 10 rest. The tubes are combined by means of a bracket construction which is turnable about a longitudinal shaft 13, see especially FIG. 7. The shaft 13 is under articulation carried up at its ends by piston bars 14 in a couple of servo motors $15_1$ and $15_2$, resp., see FIG. 3. By means of the last mentioned servo motors, therefore, the auxiliary table may be elevated into the space between the two half parts $8_1$ and $8_2$ of the main table, after they have been separated in the above indicated manner.

Figure 6:
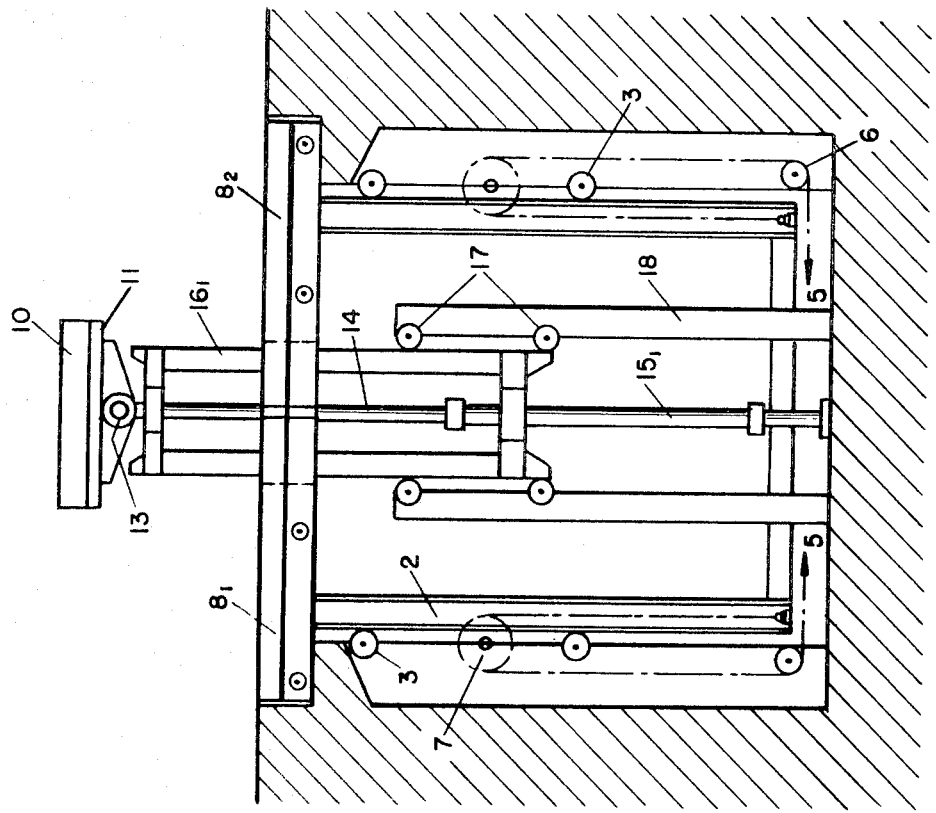

For guiding the auxiliary table at its elevation movement a couple of pillars 16 serve, sliding against runner wheels 17, which are mounted in bearings in the fixed pillars 18, see FIGS. 1, 5 and 6. In FIG. 6, the auxiliary table is shown in a position, elevated above the main table $8_1$, $8_2$, which has again been dropped down into the level of the floor. This dropping movement was made possible by recesses 19, 20 being made in the main table, adapted as to position and magnitude according to the means, carrying up the auxiliary table. These recesses are covered by free cushions at the times, when the auxiliary table is not elevated, as shown in FIG. 1 regarding the recess 20. It is therefore also obvious, that as soon as the auxiliary table has been elevated sufficiently above the main table and the cushions in the recesses 19 and 20 have been removed, it is possible to bring the two half parts 8₁ and 8₂ of the main table together and thereafter to drop it down to a suitable position of height, for instance in level with the floor in the operation room.

The arrangement now described is made in order that one should easily place the animal on the one half part of the main table, whereafter the auxiliary table is elevated in level with the main table and the animal is brought over on the auxiliary table in a suitable operation position, the main table is brought together and dropped down, for instance in level with the floor of the operation room. At these manipulations, of course, one may use the main table alone in the usual way without applying to the auxiliary table.

All of the servo motors are suitably hydraulic and are controlled from a central control valve panel. Even if in the following some control means will be shown to be manually controlled, it is obvious, that one may serve them by means of hydraulic or other servo motors, without thereby departing from the spirit of the invention.

The present invention now especially regards the construction of the auxiliary table, which is provided with all kinds of support means, by which it is possible to keep the anaesthetized animal in the position most suitable for the operation to be made, for instance resting on its back. These details will be evident from FIGS. 7 and 8, to which reference is now made. The frame work carrying up the auxiliary table, here consists in brackets 23, which embrace the hub 24 of the shaft 13. This shaft is turnable for inclination of the auxiliary table 10 along with its cushions 12. The control means for such inclination have been indicated in FIG. 7 in the form of a cog segment, a so called quadrant 21, in incission with a worm wheel and a hand wheel. The cross way parts of the frame work carrying up the auxiliary table comprise pieces of tube 22, which are of a dimension allowing for shafts 26 being inserted into them, said shafts carrying up the support means for the body of the animal. One such support means 25 is shown at right in FIG. 7. It is intended for supporting the barrel of the animal. Another such support means is shown at 32 at left in FIG. 7. It is intended for supporting the withers of the animal. The support means are lockable after being adjusted in adapted positions, more closely in the following way:

The bar 26', which is attached to the shafts 26 and carries up the support 25, carries up this support over a shaft 28 running in the longitudinal direction of the auxiliary table, so that the support means may be displaced sidewardly by pushing the shaft differently far into the tube 22, and also be turned into different inclination about the shaft 28. The shaft 28 is surrounded by an excenter disc in connection with a lever 29, so that one may by tightening the excenter disc lock the support means in the adjusted position. Generally no specific locking means is required for preventing displacement of the shaft 26 inside of the tube 22, but if such a locking means should be required in any specific case, it is also easily applied in a way, which will be evident to any person skilled in the art.

The shaft 26 on the left side of FIG. 7 carries up a bearing bracket 31, in the upper end of which a shaft is provided, corresponding to the shaft 28 in the arrangement, which is shown on the right side of FIG. 7. Also in this case, an excenter disc arrangement is provided for locking the support 32 in a suitable position for the withers of the animal, as shown at 33.

In the modified arrangement according to FIG. 9, the main table is not elevatable per se but comprises two fixed parts 8, each separately covered by a cushion 9. The two parts 8 are in a fixed position on a distance, adapted to the auxiliary table 10, and this may be dropped down so far, that it lies in level with the two side or main tables 8, but from this position the auxiliary table may be elevated as indicated by dash lines in FIG. 9. The control of the auxiliary table and especially its provision with support means may in all respects take place in the same manner as described above in connection with FIGS. 7 and 8.

I claim:

1. The combination comprising an elongated operating table for supporting an animal being operated upon, and having a longitudinal axis, a shaft carried by said table and directed parallel to said longitudinal axis, at least one side support for supporting the animal, and means pivotally- and laterally-movably mounting said side support on said shaft, whereby said side support can be displaced in a direction perpendicular to said longitudinal axis and can be pivoted about said shaft axis.

2. The combination set forth in claim 1, and further comprising elevator means for raising and lowering said operating table and said support carried thereby.

3. The combination set forth in claim 1, and further comprising a tubular frame supporting said operating table, a plurality of shafts inserted in said tubular frame, and at least two side supports respectively pivotally- and laterally-movably mounted on said shafts.

4. The combination set forth in claim 1, and further comprising locking means for locking said side support in its adjusted position.

5. The combination set forth in claim 4, wherein said locking means include excenter discs.

6. The combination set forth in claim 1, and further comprising a further shaft positioned parallel to the longitudinal axis of said operating table, means mounting said table on said shaft to accommodate movement of said table about said shaft to various planes of inclination.

7. The combination set forth in claim 1, wherein said operating table is adjustable both in height and in inclination.

References Cited

UNITED STATES PATENTS

| | | | |
|---|---|---|---|
| 743,495 | 11/1903 | Hanley | 5—72 X |
| 2,897,029 | 7/1959 | Maisel | 269—323 |
| 2,926,660 | 3/1960 | Thompson | 269—322 X |

LESTER M. SWINGLE, Primary Examiner

D. D. EVENSON, Assistant Examiner

U.S. Cl. X.R.

119—103